United States Patent
Morgan

(10) Patent No.: US 7,402,271 B2
(45) Date of Patent: *Jul. 22, 2008

(54) CASTABLE LIQUID RUBBER COMPOSITIONS FOR GOLF BALLS

(75) Inventor: William E. Morgan, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 149 days.

This patent is subject to a terminal disclaimer.

(21) Appl. No.: 11/001,530

(22) Filed: Dec. 1, 2004

(65) Prior Publication Data

US 2006/0116481 A1    Jun. 1, 2006

(51) Int. Cl.
*B29C 39/12*    (2006.01)
*A63B 37/12*    (2006.01)
*A63B 37/00*    (2006.01)
*C08L 9/00*    (2006.01)

(52) U.S. Cl. .................. 264/279.1; 264/255; 526/120; 526/224; 526/240; 526/335; 526/338; 525/274; 473/373; 473/374; 473/378; 473/385

(58) Field of Classification Search .............. None
See application file for complete search history.

(56) References Cited

U.S. PATENT DOCUMENTS

| | | | |
|---|---|---|---|
| 4,722,977 A | 2/1988 | Fischer | 525/350 |
| 5,006,297 A | 4/1991 | Brown et al. | 264/234 |
| 5,096,201 A | 3/1992 | Egashira et al. | 273/218 |
| 5,340,112 A | 8/1994 | Hamada et al. | 273/226 |
| 5,703,166 A | 12/1997 | Rajagopalan et al. | 525/196 |
| 5,733,428 A | 3/1998 | Calabria et al. | 264/134 |
| 5,783,293 A | 7/1998 | Lammi | 428/212 |
| 5,824,746 A | 10/1998 | Harris et al. | 525/196 |
| 5,885,172 A | 3/1999 | Hebert et al. | 473/354 |
| 6,030,296 A | 2/2000 | Morgan et al. | 473/361 |
| 6,132,324 A | 10/2000 | Hebert et al. | 473/378 |
| 6,194,504 B1 | 2/2001 | Nagel et al. | 524/394 |
| 6,254,946 B1* | 7/2001 | Hirata et al. | 428/35.2 |
| 6,302,808 B1 | 10/2001 | Dalton et al. | 473/371 |
| 6,369,125 B1* | 4/2002 | Nesbitt | 522/142 |
| 6,486,261 B1 | 11/2002 | Wu et al. | 525/332.6 |
| 6,494,795 B2 | 12/2002 | Sullivan | 473/372 |
| 6,565,918 B2* | 5/2003 | Hughes et al. | 427/136 |
| 7,129,295 B2* | 10/2006 | Isogawa et al. | 525/131 |
| 2002/0098915 A1* | 7/2002 | Cavallaro et al. | 473/354 |
| 2003/0073517 A1 | 4/2003 | Ichikawa et al. | 473/378 |
| 2004/0097653 A1* | 5/2004 | Kim et al. | 525/130 |
| 2006/0083863 A1* | 4/2006 | Cavallaro et al. | 427/421.1 |

FOREIGN PATENT DOCUMENTS

JP    2002017900    *    1/2002

OTHER PUBLICATIONS

Schey, Introduction to Manufacturing Processes; (1977) p. 410.*
"Liquid Polybutadienes Krasol," available at http://www.krasol.com/basinf.htm, date unknown.
Kaucuk Liquid Rubber Krasol Brochure, date unknown.
"Krasol Comprehensive information," available at http://www.krasol.com, date unknown.
Sartomer, "A New Fast Reaction Polymeric Anhydride Hardner for Epoxies and its Use to Compound Toughened," Available at http://www.sartomer.com. Oct. 2001.
Sartomer Liquid PBO, Schaeffer, William and Yang, Bo, "Photocurable Hydrophobic Oligomers Based on Liquid Polybutadienes," available at http://www.sartomer.com. Feb. 2002.

* cited by examiner

*Primary Examiner*—David Buttner

(57) ABSTRACT

A golf ball comprising a layer made from a liquid rubber composition is disclosed. A castable liquid polybutadiene is the preferred principal rubber component. The molecular weight of the castable liquid polybutadiene is at least about 1,000 and the castable liquid polybutadiene is in a liquid state at room temperature. The castable liquid rubber layer can be a cover layer, a casing layer, an intermediate layer or a core layer.

8 Claims, 4 Drawing Sheets

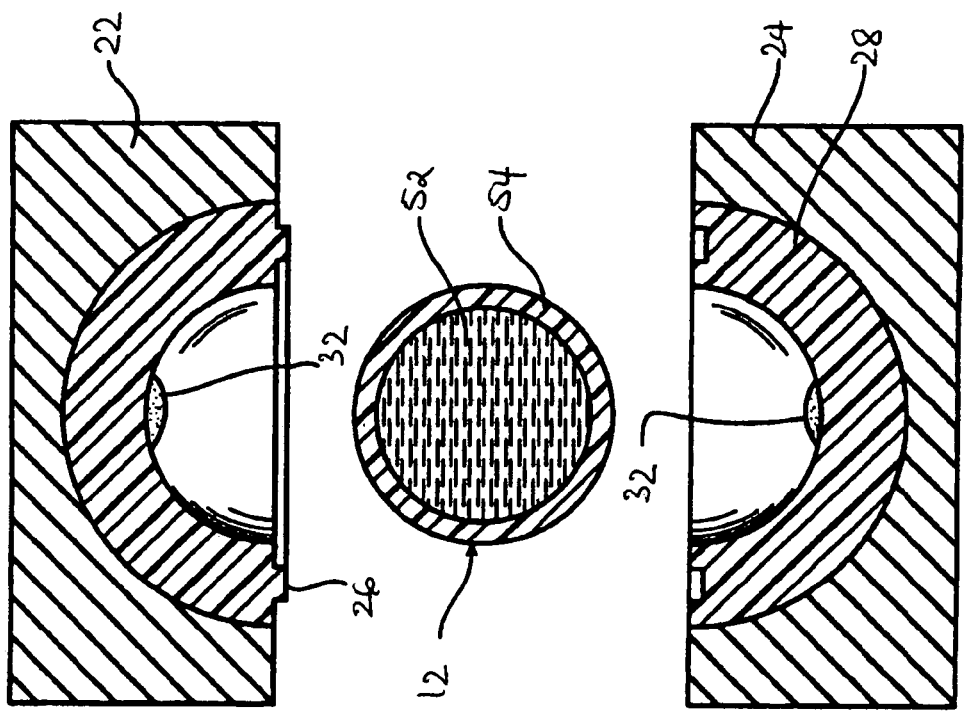
Fig. 7
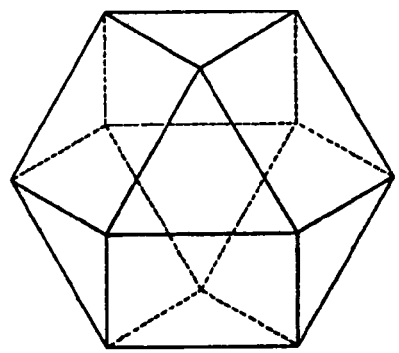
FIG. 6C
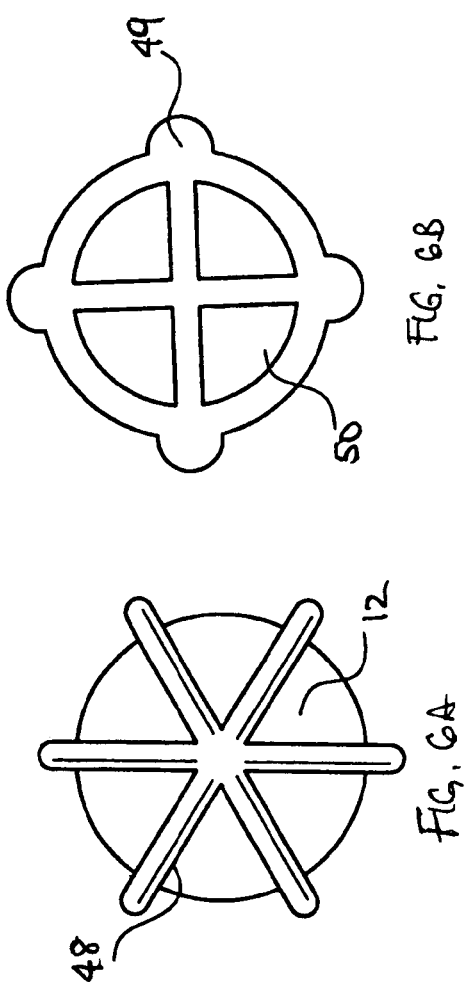
FIG. 6B
FIG. 6A

CASTABLE LIQUID RUBBER COMPOSITIONS FOR GOLF BALLS

FIELD OF THE INVENTION

This invention relates generally to golf balls, having at least a layer formed from castable liquid rubber.

BACKGROUND OF THE INVENTION

Conventional solid golf balls have primarily two functional components, i.e., the core and the cover. The primary purpose of the core is to be the "spring" of the ball or the principal source of resiliency. The primary purpose of the cover is to protect the core. Solid golf balls include two-piece balls and multi-layer balls. Two-piece solid balls are made with a single-solid core, which is usually a cross-linked polybutadiene rubber encased by a hard cover material. The resiliency of the core can be increased by increasing the cross-link density of the core material. As the resiliency increases, however, the compression may also increase making the balls stiffer. Stiffness is a physical attribute defined by load per unit of deflection. In the golf ball art, stiffness is commonly measured using Atti and Rheile "compression" gauges; however, other methods can be used. Multi-layer solid balls generally include multi-layer core constructions or multi-layer cover constructions, and combinations thereof.

Different covers vary in the types of protection they provide, and different cores have different protection requirements. For example, polybutadiene cores in solid balls can be adversely affected by moisture, and their covers should have good moisture barrier properties and should be applied to the cores soon after their formation. On the other hand, if a wound core is exposed to air, the windings may oxidize rapidly and lose their resiliency. As a result, wound balls require covers that protect them from oxidation.

A correlation has been observed between the stiffness of the cover and the resiliency of the ball. Stiff or hard thermoplastic ionomer covers can function as a hoop-stress layer providing both core protection and improved resilience. However, high hoop-stress layer may cause the ball to have a hard feel and to perform less well in greenside play. Ionomers are commercially available as SURLYN® produced by E.I. DuPont de Nemours & Co. of Wilmington, Del., among others, and are commonly used as golf ball covers.

Other polymers can also be used as cover materials. U.S. Pat. No. 6,132,324 discloses a method of making a golf ball having polyurethane cover. This patent is hereby incorporated by reference in its entirety. Polyurethanes have been long recognized as useful materials for golf ball covers. Polyurethane compositions are the product of a reaction between a curing agent and a polyurethane prepolymer, which is itself a product formed by a reaction between a polyol and a diisocyanate. The curing agents are typically diamines or glycols. A catalyst is often employed to promote the reaction between the curing agent and the polyurethane prepolymer.

Since 1960, various companies have investigated the usefulness of polyurethane as a golf ball cover material. The first commercially successful polyurethane covered golf balls were the Titleist® Professional®, which was released in 1993, and the Spalding® Executive. Subsequently, the Titleist® Pro-V1® ball was introduced successfully in 2000 with a solid resilient solid polybutadiene core, a hard ionomer casing and a polyurethane cover. The Pro-V1 ball provided both professional and amateur players with long distance off of drivers and better control for greenside play.

A drawback from using polyurethane as the cover layer is that aromatic polyurethane lacks color stability when exposed to ultraviolet light. On the other hand, as discussed above ionomer resins can be too rigid as a cover layer, which can negatively affect greenside play. Compression molded solid polybutadiene had been used in one-piece golf balls, and offered good surface durability. This polybutadiene surface also retained its appearance and durability after long term play. However, one-piece golf balls are unable to achieve the performance characteristics required in high performance balls. Furthermore, the surface finish of compression molded polybutadiene is less aesthetically pleasing as polyurethane or ionomer covers.

For golf ball cores, the most common polymer used is solid polybutadiene, and more specifically, polybutadiene having a high cis-isomer concentration. In one example, U.S. Pat. No. 6,302,808 B1 discloses a ball comprising a core encased by an intermediate layer made from a three-layer composite and a cover. The core and the multi-layer intermediate layer are made from solid polybutadiene and provide improved playing characteristics such as spin and overall driving distance. Liquid polybutadiene has been used as a component in core or cover formulations. U.S. Pat. No. 5,096,201 discloses a golf ball composition, which includes solid rubber and a premix of co-crosslinking agents. The premix contains a liquid polymer, e.g., butadiene rubber, and an unsaturated fatty acid. U.S. Pat. No. 5,215,308 discloses a golf ball formulation that includes a base rubber, a co-crosslinking agent and an organic peroxide. The base rubber includes at least 40% of solid polybutadiene cis-1,4 isomer and a liquid polybutadiene and/or liquid polyisoprene. U.S. published patent application no. 2003/0073517 discloses a cover formulation, which includes an ionomer resin, a urethane material and a rubbery elastomer. The rubbery elastomer includes an elastomer and an optional polar-bearing compound, which can be liquid polybutadiene, among many other polymers.

However, the prior art does not disclose a golf ball having a layer, such as cover or casing layers, made from castable liquid polybutadiene.

SUMMARY OF THE INVENTION

The present invention is directed to a golf ball having at least a layer made from a castable liquid polybutadiene.

The present invention is further directed to a golf ball comprising one or more of the core, intermediate or cover layers made from castable liquid polybutadiene.

The present invention is directed to a golf ball comprising a layer made from a rubber composition, wherein said rubber composition comprises castable liquid polybutadiene as the principal rubber component and wherein the molecular weight of the castable liquid polybutadiene is at least about 1,000 and wherein the castable liquid polybutadiene is in a liquid state at room temperature. The castable liquid preferably comprises less than 30% by weight of vinyl-1,2 isomer. The molecular weight is preferably at least 2,000 and more preferably at least 5,000. The liquid polybutadiene in one embodiment can also be substantially the sole rubber component.

The castable liquid polybutadiene can be functionalized with epoxy, (meth)acrylate, hydroxyl, vinyl, isocyanate, ester, carboxyl or carbonyl groups. The castable liquid polybutadiene can be polymerized ultraviolet light or photo-polymerization. The rubber component may also comprise a reactive co-agent, a crosslinking agent, a cis-to-trans catalyst and/or a free radical initiator.

The castable liquid polybutadiene layer can be an intermediate layer, a core layer or a cover layer. This layer can also be a water vapor barrier layer, and may contain fillers to alter properties of the layer. This layer may have non-uniform thickness or a geodesic shape, or may define openings thereon. This layer may also encase a non-uniform thickness layer. It may also encase a liquid filled or hollow core. The castable liquid polybutadiene layer can be cast, compression molded or injection molded.

Exemplary golf balls made in accordance with the present invention are described in detail below.

BRIEF DESCRIPTION OF THE DRAWINGS

Further features and advantages of the invention can be ascertained from the following detailed description that is provided in connection with the drawing(s) described below:

FIGS. 6A, 6B and 6C are exemplary geometrically challenging golf ball layers that can be cast with liquid polybutadiene; and FIG. 7 is a cross-sectional view of a mold and a liquid-filled golf ball core.

DETAILED DESCRIPTION

In accordance to one aspect of the present invention, castable liquid rubber compositions, such as liquid polybutadiene, are used in golf balls. These compositions preferably have castable liquid polybutadiene as the principal rubber component. The liquid polybutadiene composition is preferably cast, and reacted or cured to form solid layer(s) in a golf ball. Advantages from using a castable liquid polybutadiene include the ability to form geometrically challenging layers and the ability to form very thin layers. A durable and aesthetically pleasing cover layer can also be formed from castable liquid polybutadiene. Solid innermost core and/or intermediate layer(s) can also be made from castable liquid polybutadiene.

Liquid polybutadienes are low molecular weight polymers, which are clear liquid at room temperature and whose main chain has a microstructure composed of vinyl-1,2 isomer, trans-1,4 isomer and cis-1,4 isomer. Preferably, the vinyl-1,2 isomer content is less than 30% by weight to protect low temperature properties of the cast layer. The molecular weight of liquid polybutadiene is at least about 1,000 and preferably at least about 2,000 and more preferably at least about 5,000. The preferred Mooney viscosity of liquid polybutadiene is less than about 10,000 cp and more preferably less than about 1,000 cp.

Due to the unique polybutadiene backbone chemistry, thin films cured from this polymer have inherent hydrolytic stability, low temperature flexibility and low moisture permeability. It is also resistant to aqueous acids and bases. Liquid polybutadiene can be functionalized with epoxy, (meth)acrylate, hydroxyl, vinyl, isocyanate, ester, carboxyl and carbonyl groups. The epoxy and (meth)acrylate groups are preferred, because polymerization can be photo-induced by either free radical or cationic mechanism. Photo-polymerization, photo-curing or photo-crosslinking can be utilized in making thin films and coatings from liquid polyurethane.

Liquid polybutadienes are commercially available as (meth)acrylated liquid polybutadiene, epoxidized liquid polybutadiene, liquid polybutadiene dimethacrylate, and liquid polybutadiene urethane diacrylate from the Sartomer Company in Exton, Pa., under Ricacryl® and poly BD® tradenames. Liquid polybutadienes are also available from the Nippon Oil Company as Nisseki Polybutadiene B-3000, from the Kuraray Company as Kuraray LIR-300, from the Idemitsu Petrochemical Company, Ltd, as R-45HT, and from the Krasol Company as Krasol liquid polybutadiene, among others.

Figure 1:
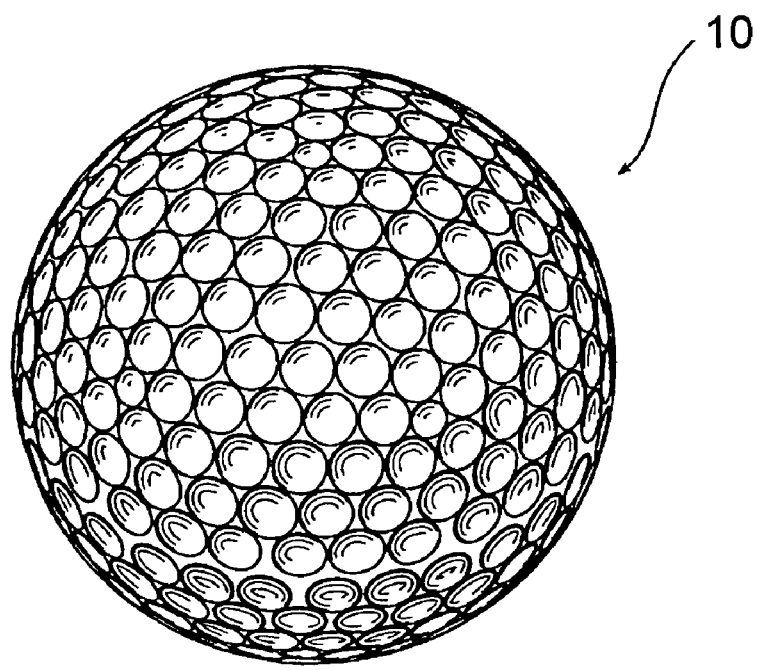
FIG. 1 is a front view of a golf ball.
Figure 2:
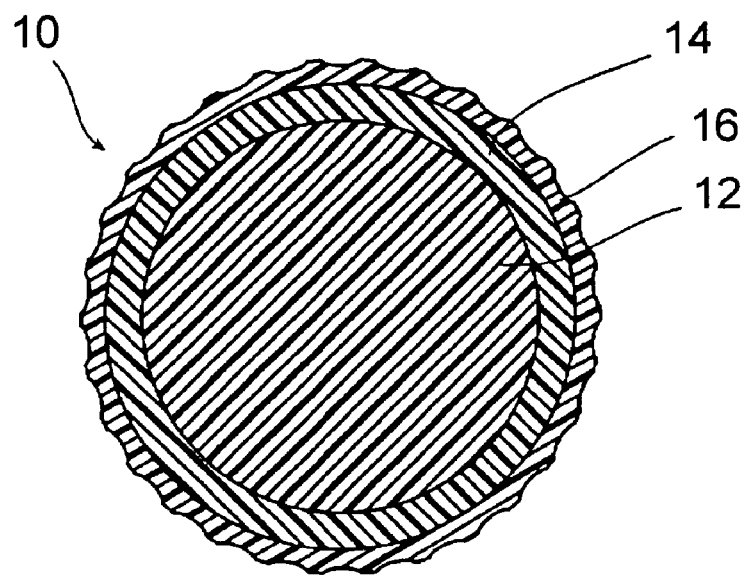
FIG. 2 is cross-sectional view of a first embodiment of golf ball 10 according to the present invention showing core 12, intermediate layer 14 and cover 16.

In one example, a (meth)acrylate functionalized liquid polybutadiene is cast to a uniform thickness of about 5 mils. The thin film is then cured under mercury vapor lamp to cross-link the film using ultraviolet rays. The wattage and time under the lamp can be calibrated to cure the entire thickness of the film. The cured film exhibits superior hydrolytic stability and low transmission to water vapor. Cured thin films of liquid polybutadiene are also resistant to aqueous acidic and basic solutions. The film can be semi-cured so that it retains its shape and the film is then completely cured in a compression mold, after the film is placed on a golf ball subassembly. The semi-cured film can then be shaped into hemispherical shells or figure-eight shapes and molded on golf ball core 12 of ball 10 to form intermediate layer 14, which in this embodiment is a water vapor barrier layer 14, as shown in FIGS. 1 and 2.

Intermediate/water vapor barrier layer 14 resists the encroachment of water vapor into the inner core. Solid polybutadiene, the most commonly used polymer in golf ball cores, when cross-linked with peroxide and/or zinc diacrylate is susceptible to have its resilience degraded by encroaching water vapor. Water vapor barrier layer 14 preferably has a moisture vapor transmission rate lower than that of cover 16, and may include nano particles, flaked-metals, such as mica, iron oxide and aluminum, or ceramic particles blended therein to provide a tortuous path to water encroachment. Water vapor barrier layer is fully disclosed in commonly owned U.S. patent application Ser. No. 09/973,842 entitled "Golf Ball with Moisture Vapor Barrier Layer," filed on Oct. 9, 2001, and this commonly owned patent application is incorporated by reference herein in its entirety.

In another example, liquid polybutadiene without any functional group (commercially available as Krasol LB) is vulcanized with a reactive co-agent, a peroxide and/or a sulphur. The heat necessary for vulcanization is provided by casting or injection molding processes. The preferred manufacturing method is casting, similar to the casting processes for making polyurethane covers disclosed in commonly owned U.S. Pat. Nos. 5,006,297, 5,733,428 and 6,132,324, among others. These references are incorporated herein by reference in their entireties.

As used herein, the term castable means capable of being cast into one or more layers in a golf ball. The castable liquid polybutadiene compositions of the present invention can be cast, compression molded or injection molded, as well as being made by other manufacturing techniques into one or more layers in a golf ball. The present invention is therefore not limited to any particular manufacturing technique.

Polybutadiene used in golf balls typically incorporates at least one reactive co-agent to enhance their hardness. Suitable co-agents for use in this invention include, but are not limited to, an unsaturated carboxylic acid or an unsaturated vinyl compound. For liquid polybutadiene, the preferred reactive co-agent is an unsaturated vinyl compound. A preferred unsaturated vinyl is trimethylolpropane trimethacrylate, commercially available as SR-350 from Sartomer. Trimethylolpropane trimethacrylate is particularly suitable because it is a clear liquid at room temperature and can be readily mixed with the liquid polybutadiene.

A cross-linking agent is included to increase the hardness of the reaction product. Suitable cross-linking agents include one or more metallic salts of unsaturated fatty acids or monocarboxylic acids, such as zinc, aluminum, sodium, lithium, nickel, calcium, or magnesium acrylate salts, and the like, and mixtures thereof. Preferred acrylates include zinc acrylate, zinc diacrylate, zinc methacrylate, and zinc dimethacrylate, and mixtures thereof. The cross-linking agent must be present in an amount sufficient to cross-link a portion of the chains of polymers in the resilient polymer component. For example, the desired compression may be obtained by adjusting the amount of cross-linking. This may be achieved, for example, by altering the type and amount of cross-linking agent, which is a method well-known to those of ordinary skill in the art. The cross-linking agent is typically present in an amount greater than about 0.1 percent of the resilient polymer component, i.e., the castable liquid polybutadiene, preferably from about 10 to 40 percent of the resilient polymer component, more preferably from about 10 to 30 percent of the resilient polymer component. When an organosulfur is selected as the cis-to-trans catalyst, zinc diacrylate may be selected as the cross-linking agent and is preferably present in an amount of less than about 25 phr. Suitable, commercially available, zinc diacrylates include those from the Sartomer Corporation. Zinc diacrylate is available in solid powder form that can be suspended in the liquid reactive co-agent, such as trimethylolpropane trimethacrylate, to be cross-linked with castable liquid polybutadiene.

As used herein, the term "parts per hundred," also known as "phr," is defined as the number of parts by weight of a particular component present in a mixture, relative to 100 parts by weight of the total polymer component. Mathematically, this can be expressed as the weight of an ingredient divided by the total weight of the polymer, multiplied by a factor of 100. In the present invention the polymer component includes castable liquid polybutadiene.

A free radical initiator can be used to promote the cross-link reaction between reactive co-agent and polybutadiene. The free radical initiators may be any known polymerization initiators that decompose during the curing cycle. Suitable initiators include peroxides. Examples of the peroxides for the purposes of the present invention include dicumyl peroxide, n-butyl-4,4-di(t-butylperoxy)-valerate, 1,1-bis(t-butylperoxy)-3,3,5-trimethylcyclohexane, α,α'-bis(t-butylperoxy)-diisopropylbenzene, 2,5-dimethyl-2,5-di(t-butylperoxy) hexane, di-t-butyl peroxide, di-t-amyl peroxide, di(2-t-butylperoxyisopropyl)benzene peroxide, lauryl peroxide, benzoyl peroxide, t-butyl hydroperoxide, and mixtures thereof. Preferably, the peroxide initiator is dicumyl peroxide having an activity between about 40% and about 100%. Also preferably, the initiator is present in the polybutadiene blend in an amount ranging between about 0.05 phr and about 15 phr by weight of polybutadiene. More preferably, the amount of the initiator ranges between about 0.1 phr and about 5 phr, and most preferably between about 0.25 and about 1.5 phr. Preferably, the peroxide selected is in liquid form. The amount of peroxide used should be measured to minimize premature reaction.

In accordance to another aspect of the present invention, radical scavengers are added to the polybutadiene to act as molecular weight adjusters. Preferred radical scavengers include sulfur compounds, such as halogenated organo-sulfur compound that can be blended with liquid polybutadiene. Halogenated organo-sulfur compounds include organic compounds wherein at least one sulfur compound is added to the polybutadiene to increase the resiliency and the coefficient of restitution of the ball. Preferred sulfur compounds include, but are not limited to, pentachlorothiophenol (PCTP) and a salt of PCTP. A preferred salt of PCTP is ZnPCTP. The utilization of PCTP and ZnPCTP in golf ball inner cores to produce soft and fast inner cores is disclosed in co-pending U.S. application Ser. No. 09/951,963 filed on Sep. 13, 2001, and is assigned to the same assignee as the present invention. The 1963 application is incorporated by reference. A suitable PCTP is sold by the Structol Company under the tradename A95. ZnPCTP is commercially available from EchinaChem. Other suitable radical scavengers include 0,0'-dibenzamidodi-phenyldisulfide. Other molecular weight adjusters are disclosed in U.S. Pat. No. 4,722,977, which is incorporated herein by reference in its entirety.

In one example, core 12 is a conventional core made with solid polybutadiene as the primary rubber component, such as those disclosed in the '963 application. Preferably, the core has a diameter from about 1.50 inches to about 1.62 inches, more preferably from about 1.55 inches to about 1.60 inches, and most preferably from about 1.55 inches to about 1.58 inches. An intermediate layer is cast from a liquid polybutadiene composition in accordance with the present invention. Preferably, intermediate layer 14 has a thickness from about 0.01 inch to about 0.05 inch, more preferably from about 0.02 inch to about 0.04 inch, and most preferably about 0.03 inch. Cover 16 can be made from ionomers, ionomer and metallocene catalyzed polymer blends, polyurea or polyurethane. Suitable metallocene catalyzed polymers and blends thereof are disclosed U.S. Pat. Nos. 5,703,166 and 5,824,746, among others. These references are incorporated herein by reference in their entireties.

In another example, core 12 is substantially the same as the core in the preceding example, and cover 16 is cast from liquid polybutadiene in accordance with the present invention. Preferably, cover 16 has a thickness in the range of about 0.01 inch to about 0.1 inch, and more preferably in the range of 0.03 inch to about 0.05 inch. Cover 16 preferably contains 100 phr of liquid polybutadiene, 15-40 phr of zinc diacrylate (ZDA), 0.1-1 phr of ZnPCTP and titanium dioxide fillers. The more preferred range of ZDA is about 15 to about 25 phr, and the more preferred range of ZnPCTP is about 0.5 phr.

In another example, core 12 is substantially the same as the core in the preceding examples. Intermediate layer 14 is an inner cover made from thermoplastic polymers, such as those described in U.S. Pat. Nos. 5,885,172 and 6,486,261. Cover 16 is made from the same materials and has the same dimensions as the preceding example.

The castable liquid polybutadiene compositions of the present invention may also include fillers, which are added to the polybutadiene material to adjust the density and/or specific gravity. As used herein, the term "fillers" includes any compound or composition that can be used to adjust the density and/or other properties of the subject golf ball. Suitable fillers include, but are not limited to, polymeric or mineral fillers, metal fillers, metal alloy fillers, metal oxide fillers and carbonaceous fillers. Fillers can be in the form of flakes, fibers, fibrils, or powders. Regrind, which is ground, recycled core material (for example, ground to about 30 mesh particle size), can also be used. The amount and type of fillers utilized are governed by the amount and weight of other ingredients in the golf ball, since a maximum golf ball weight of 45.93 g (1.62 ounces) has been established by the United States Golf Association (USGA). Suitable fillers generally have a specific gravity from about 2 to 20. In one preferred embodiment, the specific gravity can be about 2 to 6.

Suitable polymeric or mineral fillers include precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used. Since the polybutadiene is liquid, fillers can easily be mixed or blended to the polymer.

In one example, the cast liquid polybutadiene layer may include high density metal or metal alloy powder fillers to increase the rotational moment of inertia of the golf ball to reduce initial spin rate. High moment of rotational inertia is disclosed in commonly owned U.S. Pat. No. 6,494,795 B2. The '795 patent is incorporated herein by reference in its entirety. Preferably, the specific gravity of the filled cast liquid polybutadiene layer is greater than about 1.5, more preferably greater than about 2.5 and most preferably greater than about 5.0.

The cast liquid polybutadiene layer may also include filler or fibers that alter the flexural modulus or the hardness of the layer.

Figure 3A:
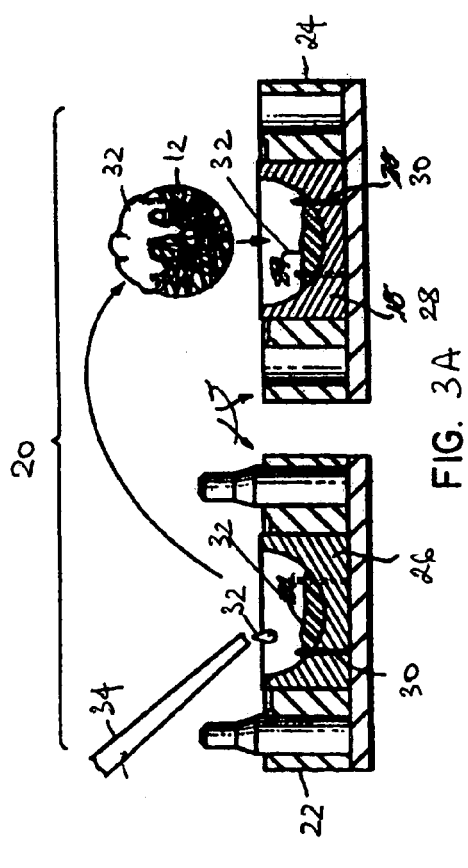
FIGS. 3A, 3B and 3C are cross-sectional views of a casting process for forming a golf ball layer from liquid polybutadiene.
Figure 3B:
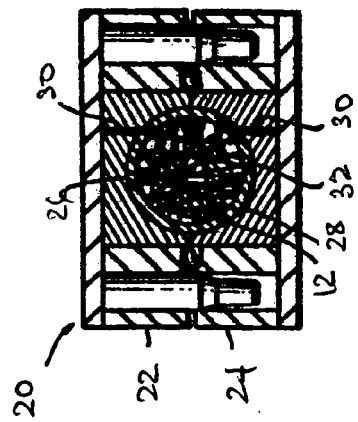
Figure 3C:
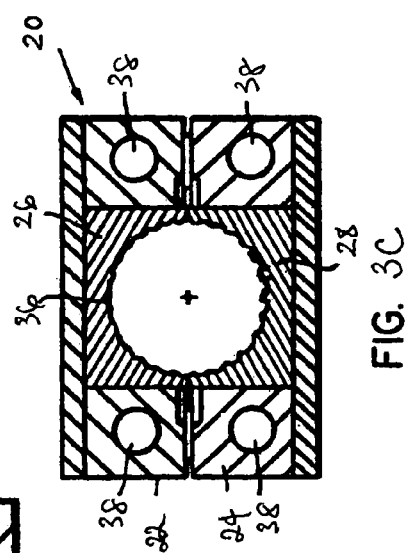

As shown FIGS. 3A-3C, mold 20 is suitable for casting intermediate layer 14 around core 12. Core 12 can be a wound core as illustrated in FIG. 3A, or a solid core as illustrated in FIG. 2, or liquid filled or hollow core as illustrated in FIG. 7. Mold 20 has top plate 22 and bottom plate 24, which contain cups 26 and 28, respectively. Each cup is adapted to receive a plurality of pins 30, which can be fixed pins or retractable pins. Pins 30 keep core 12 centered in the mold, so that the intermediate layer has a constant thickness.

Liquid polybutadiene, designated as reference number 32, is poured into the cups 26, 28 through nozzle 34 and may also coat core 12. Liquid polybutadiene 32 may be premixed with any curing agents or additives. The amount of polybutadiene poured into the mold is pre-measured to give intermediate layer the desired thickness. Due to the flowing nature of liquid polybutadiene as the mold cups are closed with the core 12 in between, liquid polybutadiene flows around the core to form the intermediate layer. The inner surface of cups 26, 28 can be smooth, or contain protrusions 36, as illustrated in FIG. 3C, to form dimples, when layer 14 is the cover layer, or to form an intermediate layer having non-uniform thickness or challenging geometry, as discussed below. Furthermore, mold 20 can also have a plurality of channels 38 to communicate hot liquid to heat and cure the liquid polybutadiene or cold liquid to cool the mold before the mold is opened.

Figure 4:
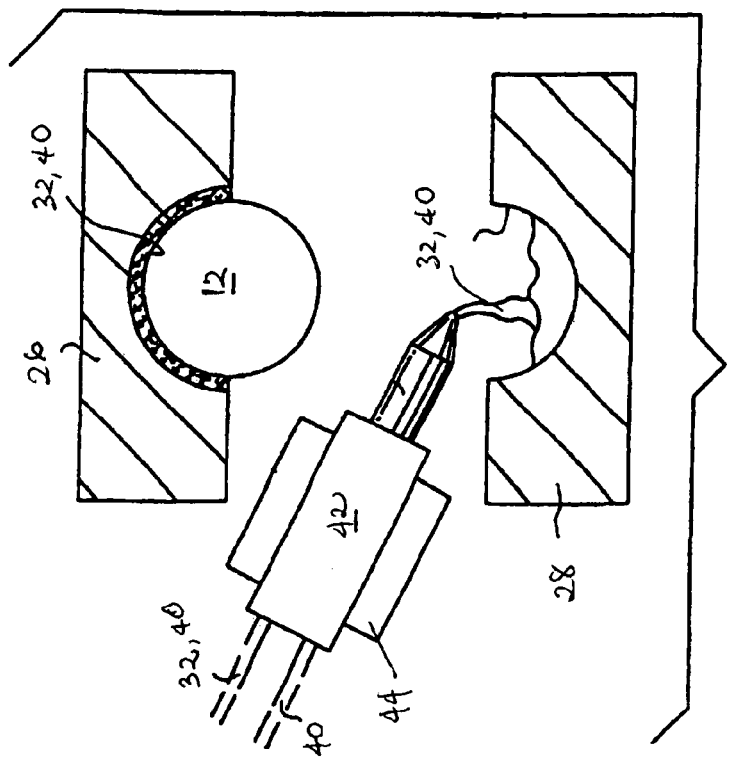
FIG. 4 is a cross-sectional view of another casting process for forming a golf ball layer from liquid polybutadiene.

Alternatively, as shown in FIG. 4, other materials such as reactive co-agent(s), accelerant(s), free radical initiator(s), cis-to-trans isomer catalyst(s), and fillers, among others, designated collectively as reference number 40 can be mixed with liquid polybutadiene 32 in mixer 42 before being poured into cups 26, 28. Mixer 42 can also have optional insulative sleeve 44, which retains the heat from any exothermic reaction within mixing chamber 42. This embodiment is preferred when material 40 is a liquid. When material 40 accelerates the curing process of liquid polybutadiene and material 40 should not be premixed. Also, as shown in FIG. 4 liquid polybutadiene can be at least partially cured to core 12 and retained in top cup 26 by a vacuum, before more liquid polybutadiene is poured into bottom cup 28 to be cured to core 12.

As discussed above, one advantage of using liquid polybutadiene is that a non-uniform thickness layer or a geometrically challenging layer can be readily made. Additionally, these layers can be readily made by casting/compression molding discussed above or by injection molding commonly known to those skilled in the art, or by co-injection molding. Co-injection molding is fully discussed commonly owned, U.S. Pat. No. 5,783,293. The '293 patent is incorporated herein by reference in its entirety.

Figure 5:
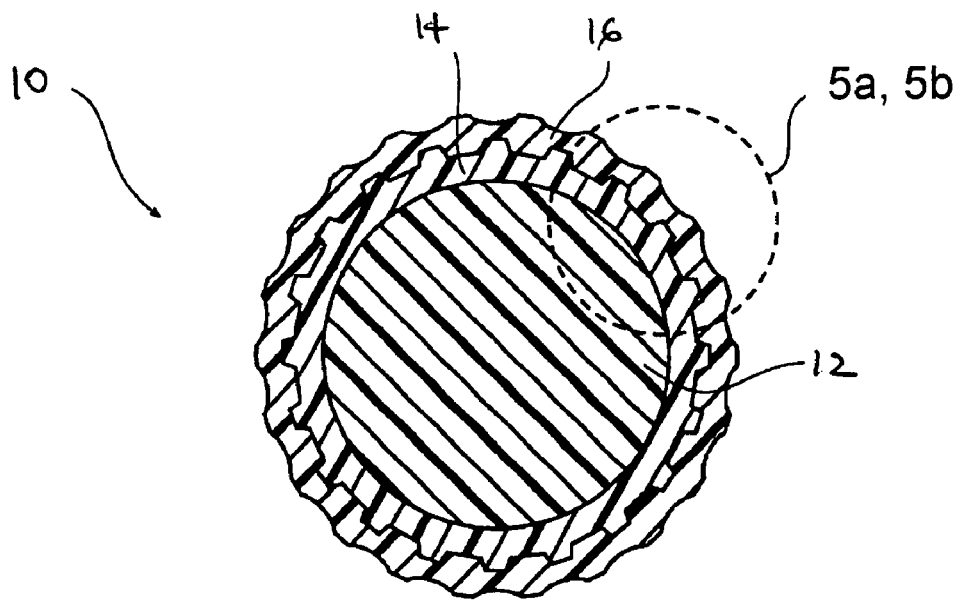
FIGS. 5, 5A and 5B are cross-sectional views of a non-uniform thickness layer made from liquid polyurethane.
Figure 5A:
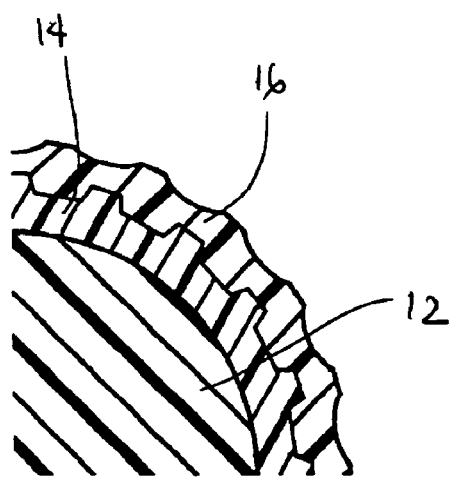
Figure 5B:
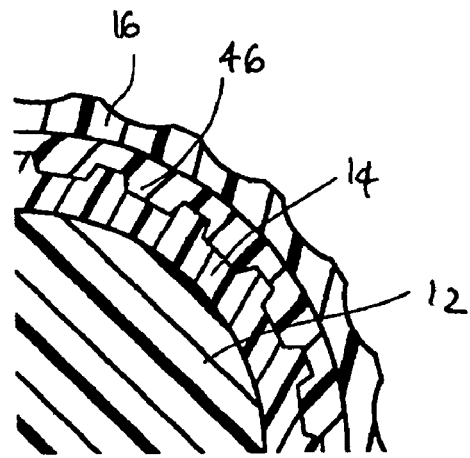

An exemplary non-uniformed thickness layer is illustrated in FIGS. 5, 5A and 5B as intermediate layer 14. Non-uniformed thickness layer is fully disclosed in commonly owned, co-pending patent application entitled "Golf Ball Having a Non-Uniformed Thickness Layer" Ser. No. 10/293,450 filed on Nov. 13, 2002. The '450 patent application is incorporated herein by reference in its entirety. Non-uniform thickness layer can be readily cast from liquid polybutadiene using a mold similar to the one illustrated in FIG. 3C. Additionally, liquid polybutadiene formulation can be used to form the layer adjacent to the non-uniform thickness layer, such as layer 46 shown in FIG. 5B.

Exemplary geometrically challenging layers are shown in FIGS. 6A, 6B and 6C. Such layers include plurality of rings 48 encircling core 12, and discontinuous shell 49, which defines a plurality of openings thereon, among others. Geometrically challenging layers can also include geodesic layers as illustrated in FIG. 6C. The geodesic layer can be a thin layer encasing the core or it can form a solid core.

In accordance with another aspect of the present invention, liquid polybutadiene 32, 40 is used to cushion liquid filled core or hollow core 12 during the compression molding process. As shown in FIG. 7, liquid polybutadiene 32, 40 is cast into cups 26, 28 to encase hollow or fluid filled core 12 which comprises shell 54 and internal volume 52. The compression force required to mold liquid polybutadiene is significantly less than the force required to compression mold a solid rubber layer around liquid filled or hollow core 12. The lower compression force reduces the probability of damaging core 12.

As discussed, liquid polybutadiene can also be cast as cover layer 16. Castable liquid polybutadiene is stable when exposed to UV light, so that a cast liquid polybutadiene cover does not change color during its useful playing life. Polybutadiene cover can be durable as the demonstrated durability of one-piece polybutadiene range balls. The casting process discussed above can also be used to cast liquid polybutadiene as a cover layer.

Other liquid rubber polymers, such as liquid polyisoprene, liquid butadiene-isoprene copolymers, liquid polybutene, or the like and combination thereof, can be substituted for liquid polybutadiene.

Other than in the operating examples, or unless otherwise expressly specified, all of the numerical ranges, amounts, values and percentages such as those for amounts of materials, and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

While it is apparent that the illustrative embodiments of the invention herein disclosed fulfills the objectives stated above, it will be appreciated that numerous modifications and other embodiments may be devised by those of ordinary skill in the art. Therefore, it will be understood that the appended claims are intended to cover all such modifications and embodiments which come within the spirit and scope of the present invention.

What is claimed is:

1. A method of making a golf ball, said method comprising:
    providing a solid golf ball core having a diameter of from 1.55 inches to 1.60 inches;
    providing a rubber composition comprising castable liquid polybutadiene as the principal rubber component, an unsaturated vinyl co-agent, a cross-linking agent comprising one or more metallic salts of unsaturated fatty acids or monocarboxylic acids, and a free radical initiator;
    wherein the molecular weight of the castable liquid polybutadiene is at least 1,000 and wherein the castable liquid polybutadiene is in a liquid state at room temperature; and
    casting the rubber composition on the golf ball core to produce a cast layer having a thickness of from 0.01 inch to 0.05 inch.

2. The method of claim 1, wherein the castable liquid polybutadiene is functionalized.

3. The method of claim 1, wherein the unsaturated vinyl co-agent is trimethylolpropane trimethacrylate.

4. The method of claim 1, wherein the rubber composition further comprises pentachlorothiophenol.

5. The method of claim 1, wherein the rubber composition further comprises zinc pentachlorothiophenol.

6. The method of claim 1, wherein the method further comprises forming a cover layer comprising polyurethane or polyurea on the cast layer, wherein the cast layer has a moisture vapor transmission rate which is lower than the moisture vapor transmission rate of the cover layer.

7. The method of claim 6, wherein the cover layer has a thickness of from 0.01 inch to 0.1 inch.

8. The method of claim 6, wherein the cover layer has a thickness of from 0.03 inch to 0.05 inch.

* * * * *